US006865543B2

(12) United States Patent
Gibbs, Sr.

(10) Patent No.: US 6,865,543 B2
(45) Date of Patent: Mar. 8, 2005

(54) VOTE CERTIFICATION, VALIDATION AND VERIFICATION METHOD AND APPARATUS

(75) Inventor: Athan Gibbs, Sr., Nashville, TN (US)

(73) Assignee: TruVote, Inc., Nashville, TN (US)

( * ) Notice: Subject to any disclaimer, the term of this patent is extended or adjusted under 35 U.S.C. 154(b) by 498 days.

(21) Appl. No.: 09/827,231

(22) Filed: Apr. 5, 2001

(65) Prior Publication Data

US 2002/0128901 A1 Sep. 12, 2002

Related U.S. Application Data

(60) Provisional application No. 60/274,704, filed on Mar. 9, 2001.

(51) Int. Cl.[7] .............................................. G06F 17/60

(52) U.S. Cl. ........................................ 705/12; 235/386

(58) Field of Search ........................... 705/12; 235/386, 235/51

(56) References Cited

U.S. PATENT DOCUMENTS

| | | | | | |
|---|---|---|---|---|---|
| 3,722,793 | A | * | 3/1973 | Aronoff | 235/50 A |
| 3,793,505 | A | | 2/1974 | McKay et al. | 235/54 |
| 5,218,528 | A | * | 6/1993 | Wise et al. | 705/12 |
| 5,377,099 | A | | 12/1994 | Miyagawa | 364/409 |
| 5,495,532 | A | * | 2/1996 | Kilian et al. | 380/30 |
| 5,610,383 | A | * | 3/1997 | Chumbley | 235/386 |
| 5,821,508 | A | * | 10/1998 | Willard | 235/51 |

(List continued on next page.)

FOREIGN PATENT DOCUMENTS

WO WO9602044 * 1/1996

OTHER PUBLICATIONS

Roy "Accuracy, Integrity and Security in Computerized Vote–Tallying"; Communications of the ACM, vol. 31.*

USATODAY Tech Report "Race is on to improve voting technology".*

Jim "Internet Voting Primer"; Aug. 2000; VoteHere.net; pp. 1–4.*

"Types of Internet Voting"; Mar. 2000; VoteHere.net; p. 1.*

"Key principles of election integrity"; Mar. 2000; VoteHere.net; pp. 1–2.*

"Benefits of Internet Voting"; Mar. 2000; VoteHere.net; pp. 1–2.*

"VoteHere Platinum"; Mar. 2000; VoteHere.net; p. 1.*

"VoteHere Gold"; Mar. 2000; VoteHere.net; p. 1.*

Timothy "Online voting proposal raised in state House"; Jul. 2000; PG News; pp. 1–2.*

Andrew et al "Vote was a Tie, Council Candidate says", Nov. 1995, Philadelphia Inquirer; Dialog file 633, Accession No 08325101.*

Diebold Election Systems Solutions, Copyright 1994–2002, Diebold, Incorporated, Retrieved on Aug. 21, 2002. Retrieved from the Internet. http://www.diebold.com/solutions/election/solutions.htm.

USA Today Tech Report, Copyright 2002, USA TODAY, Retrieved on Aug. 21, 2002. Retrieved from the Internet: http://www.usatoday.com/life/cuber/tech/review/crh818.htm.

U.S. Appl. No. 09/843,042, Gibbs.

*Primary Examiner*—Romain Jeanty
(74) *Attorney, Agent, or Firm*—Baker Donelson

(57) ABSTRACT

An election apparatus for voter certification, validation and verification of voting, providing a voting device for receiving from a voter a vote for at least one ballot selection in an election and a generator that provides a voter validation receipt bearing a voter validation number containing indicia of the voter and a report of the voting by the voter. An accessor responsive to the voter validation number enables the voter to validate the vote by comparing a report of the vote with an election result tabulated by a vote tabulation center. An election method is disclosed for voters to certify, validate, and verify votes tabulated by a vote tabulation center.

38 Claims, 9 Drawing Sheets

U.S. PATENT DOCUMENTS

| | | | | | |
|---|---|---|---|---|---|
| 5,875,432 | A | * | 2/1999 | Sehr | 705/12 |
| 5,878,399 | A | * | 3/1999 | Peralto | 705/12 |
| 6,081,793 | A | | 6/2000 | Challener et al. | 705/50 |
| 6,230,164 | B1 | | 5/2001 | Rekieta et al. | 707/201 |
| 6,250,548 | B1 | * | 6/2001 | McClure et al. | 235/51 |
| 6,540,138 | B2 | * | 4/2003 | Hall et al. | 235/386 |
| 6,550,675 | B2 | | 4/2003 | Davis | 235/386 |
| 2002/0072961 | A1 | * | 6/2002 | McDermott et al. | 705/12 |
| 2002/0077886 | A1 | * | 6/2002 | Chung | 705/12 |
| 2002/0084325 | A1 | * | 7/2002 | Reardon | 235/386 |

* cited by examiner

VOTE CERTIFICATION, VALIDATION AND VERIFICATION METHOD AND APPARATUS

This application claims the benefit of U.S. Provisional Application Ser. No. 60/274,704, filed Mar. 9, 2001.

TECHNICAL FIELD

This invention relates to computerized methods for use in enabling voters to verify that the votes cast in elections were properly registered by the voting machine as well as received, recorded, counted and correctly reported by governmental agencies in the exact manner as intended by the voter.

BACKGROUND OF THE INVENTION

In the Presidential election that was held in November of 2000, the public came to realize a fact that had long existed but which had not been widely known and appreciated. That fact was that there has long existed significant errors in state and federal elections. Exemplary of such errors are vote exclusions, vote additions and vote switching. Voters have simply had no viable way of checking to see if their votes have been recorded and counted in the manner in which they intended The present invention addresses this age old problem.

Accordingly, it is seen that a need remains for a voting certification, validation and verification method and apparatus for elections. It is to the provision of such therefore that the present invention is primarily directed.

SUMMARY OF THE PRESENT INVENTION

The present invention meets the need in the art by providing an election apparatus for validation and verification of voting by a voter for elections. The election apparatus comprises a voting device with a central processor for receiving from a voter a vote for at least one ballot selection in an election. A generator provides a voter validation receipt bearing a voter validation number containing first indicia of the voter. A validator endorses the voter validation receipt with a validation indicia, whereby the authenticity thereof can be established at a later time if necessary to correct a vote tabulation error. An accessor responsive to the voter validation number enables verifying the vote with an election result tabulated by a vote tabulation center.

In another aspect, the present invention provides an election method for validation and verification of voting by a voter, comprising the steps of:

(a) receiving by a central processor from a voter a vote for at least one ballot selection in an election;

(b) generating by the central processor a voter validation number containing first indicia of the voter associated with the voting by the voter;

(c) providing a voter validation receipt containing the voter validation number;

(d) validating the voter validation receipt, whereby the authenticity thereof can be established at a later time if necessary to correct a vote tabulation error; and (e) selectivity verifying through an accessor responsive to the voter validation number the vote of the voter with an election result tabulated by a vote tabulation center.

Objects, advantages, and features of the present invention will become apparent upon a reading of the following detailed description in conjunction with the drawings and the appended claims.

DETAILED DESCRIPTION OF THE PRESENT INVENTION

Figure 1:
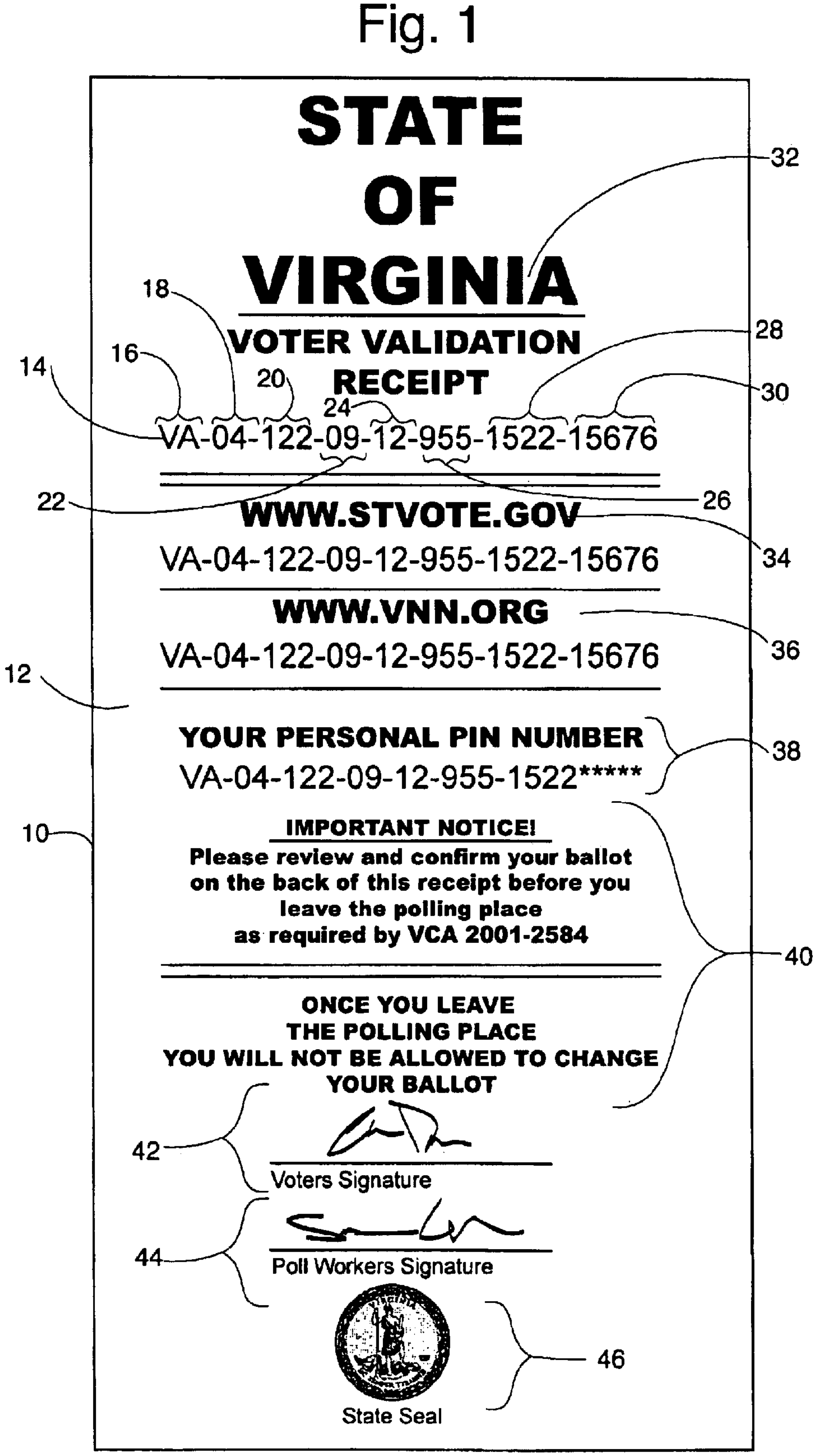
FIG. 1 depicts in plan view a front side of a voter validation receipt issued in accordance with principles of the invention.
Figure 2:
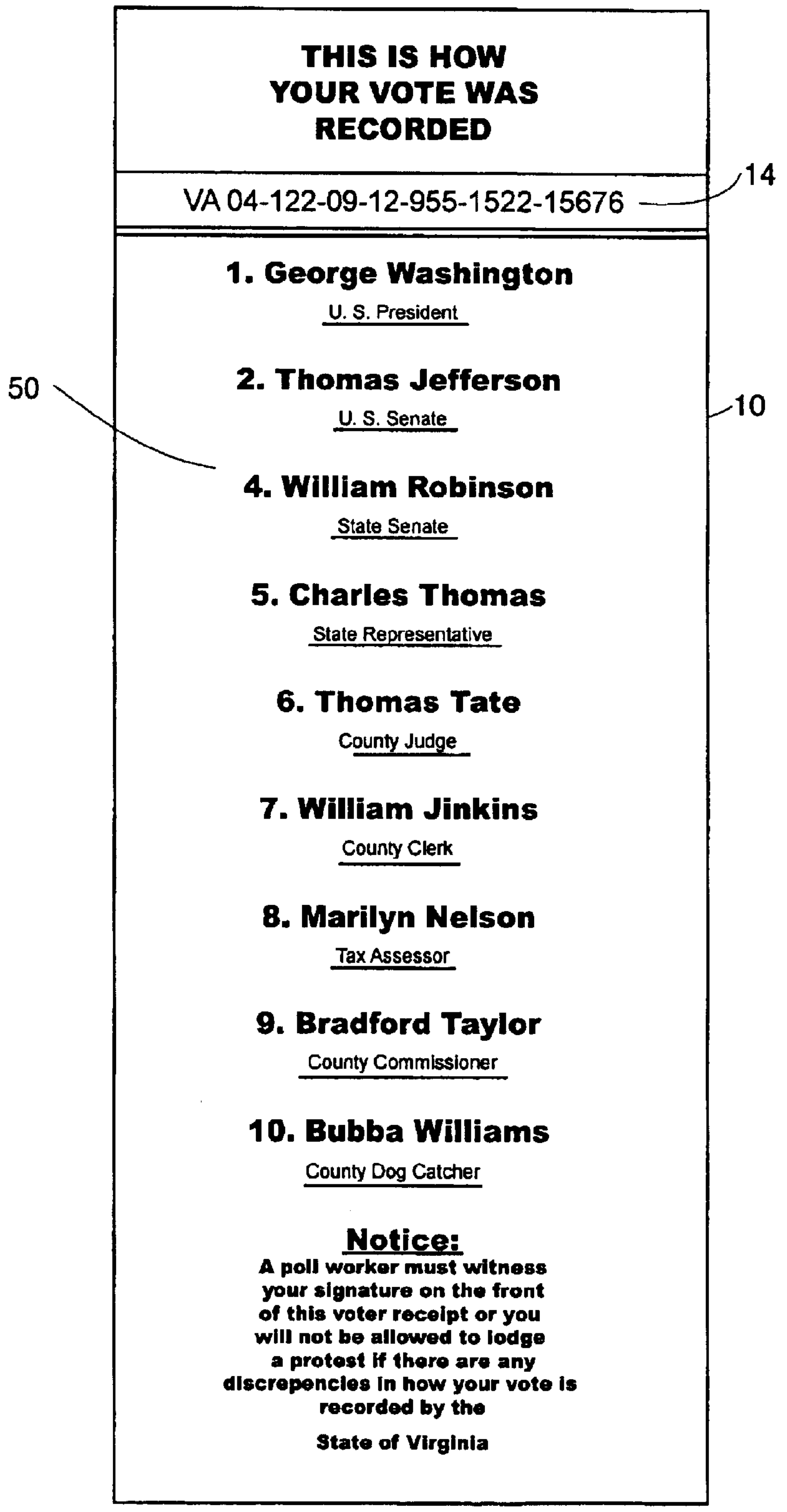
FIG. 2 depicts in plan view a back side of the voter validation receipt.

With reference to the drawings, in which like elements have like reference numerals throughout the several drawings identified above, FIGS. 1 and 2 illustrate in plan views a front and a back side, respectively, of a voter validation receipt 10, in accordance with the present invention. The voter validation receipt 10 is dispensed to each voter after voting. The voter validation receipt 10 is printed on each side with information relevant to the particular voter. In an alternate embodiment, the voter validation receipt 10 is printed in two parts. FIG. 1 illustrates a front side 12 of the voter validation receipt 10. Each voter validation receipt 10 is assigned a unique voter validation number generally 14. In the illustrated embodiment, the voter validation number 14 is computer generated. The voter validation number 14 includes several fields of identifiers of information as to the particular voting place of the voter. The identifiers may be alphabetical characters and/or numeric, with separators between adjacent fields for convenience. Each of the fields within the voter validation number facilitates an audit function that can be used to detect voter error, as well as the errors and unscrupulous activities on the part of others.

The present invention is contemplated for use with voting generally, but is particularly adapted for use where the geographic area involved is divided into superior and inferior regions. For example, the U.S. is divided into discrete states; the states subdivide generally into counties of smaller areas; the counties further subdivide into local voting precincts. In the illustrated embodiment, the fields of identifiers or codes within the voter validation number 14 represent: (a) the 15 state code 16, (b) the county code 18, and (c) the precinct code 20, in which the voter voted, together with (d)

the voting machine code 22 used by the voter, (5) a poll worker's number 24 who verifies the voter, (6) the time of day 26 of the vote by the voter, (7) the cumulative number of votes 28 on the particular voting machine 22 at the time the voter's vote is cast and (8) the cumulative number of votes 30 cast in the precinct at the time the voter's vote is cast.

Embodied in the system are a number of audit procedures, system logic, reasonableness tests and checks designed to identify voter errors and vote fraud. The time and place of every vote cast within the state can be identified and accounted for thorough a time and place audit routine, while at the same time maintaining the absolute anonymity and confidentiality of every voter.

The front side of the voter validation receipt 10 further includes an identification of the particular state generally 32. The voter validation receipt 10 includes an identifier as to a state tabulation web site 34 and a national tabulation web site 36, together with a personal identification number (PIN) 38. The PIN 38 is used by the voter, as discussed below, to access the web sites 34, 36 to verify and validate the voter's votes and the votes inclusion in the tabulation of votes for the candidates selected by the voter. Space is provided for instructions on review 40, together with a voter's endorsement 42 and a poll worker's endorsement 44 and seal 46 of the voter validation receipt 10.

As illustrated in FIG. 2, the backside (or the second part) of the voter validation receipt 10 lists the candidates generally 50 for whom the voter voted, including the name and the office.

Figure 3:
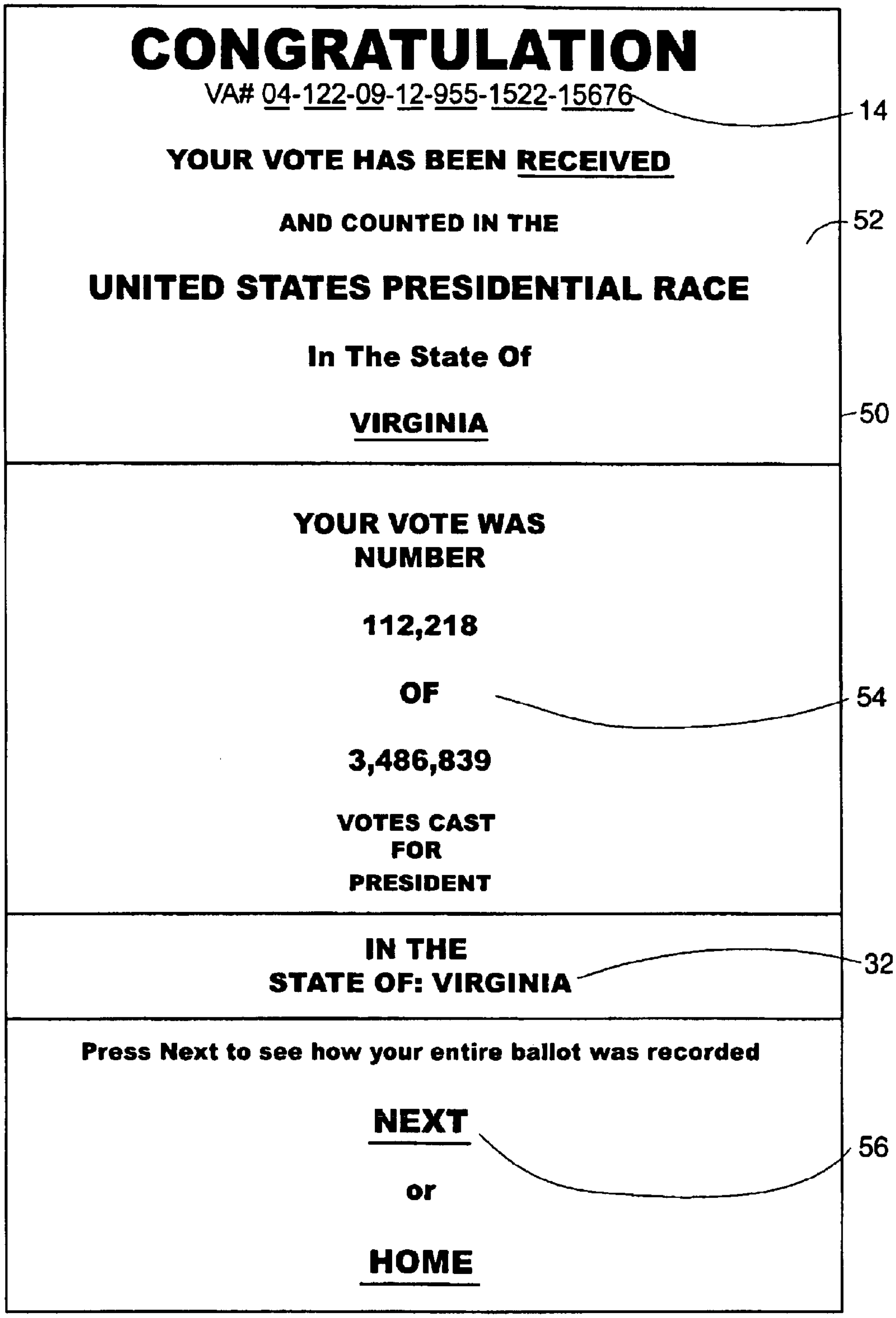
FIG. 3 illustrates a first voter validation screen of a state-level election reporting web site accessible through a computerized network, in accordance with the present invention.

FIG. 3 illustrates a first voter validation screen 50 of a state-level election reporting web site accessible through a computerized network, in accordance with the present invention. Upon presentation of appropriate security mechanisms, the first voter validation screen 50 includes a display of the particular voter's validation receipt number 14, together with a report 52 that the voter's vote was included in the national election for the particular state. The report 52 includes a statement 54 as to the sequential number of the vote the voter represents in the total number of votes for the candidate. A button 56 allows the voter to move to the second voter validation screen 60 of the state-level election reporting web site accessible through a computerized network, illustrated in FIG. 4. The second voter validation screen 60 includes a report generally 62 of the candidates and offices for whom the voter voted, together with the sequential number 64 of the vote by the voter for the candidate and the total number of votes 66 for the candidate. An instruction message 68 explains to the voter how to report discrepancies between the information on the voter validation receipt 10 and the information on the voter validation screens 50, 60.

Figure 5:
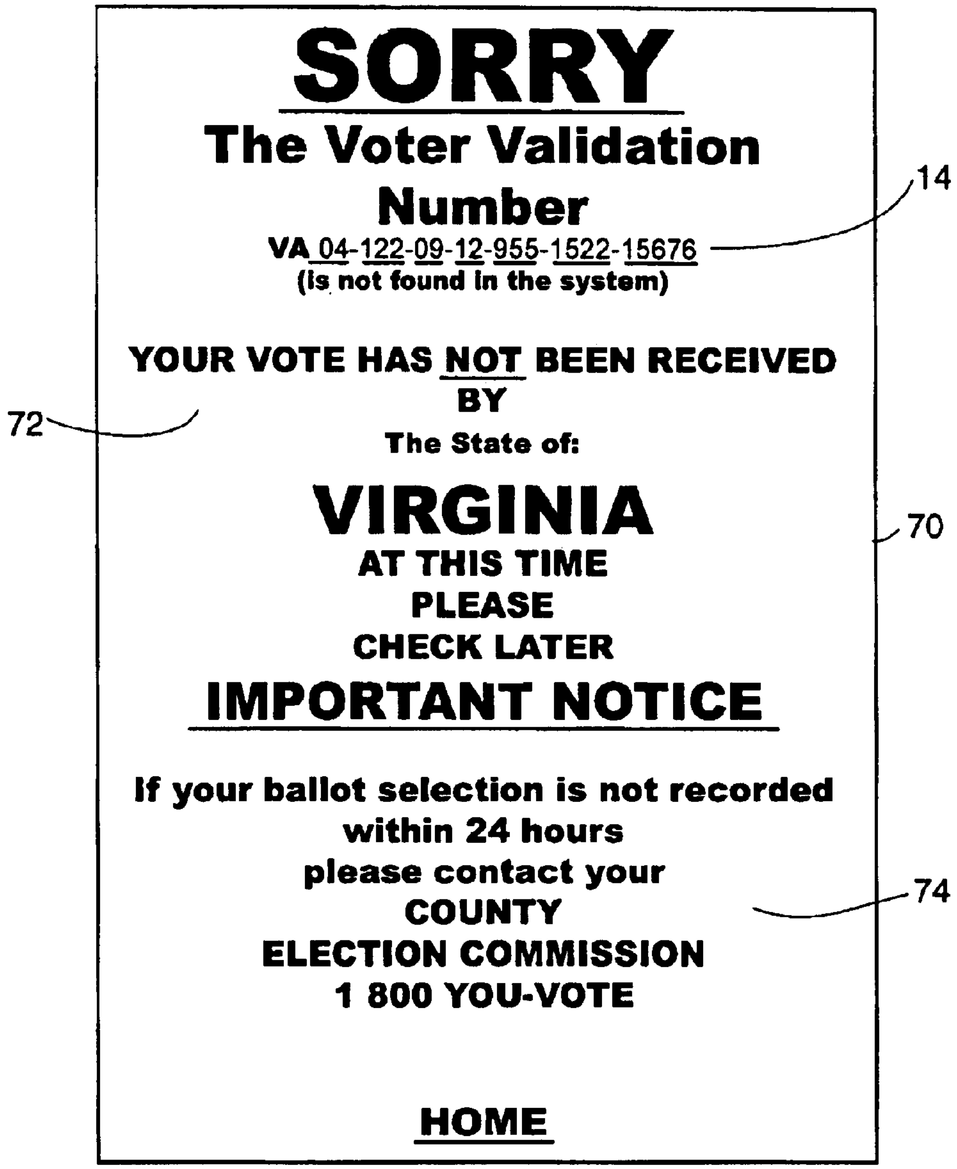
FIG. 5 illustrates a third voter validation screen of a state-level election reporting web site accessible through a computerized network, in accordance with the invention.

FIG. 5 illustrates a third voter validation screen 70 of the state-level election reporting web site accessible through a computerized network, in accordance with the invention. The third voter validation screen 70 displays the voter validation number 14, together with a statement 72 that the vote has not been received, such as by state election tabulation center. An advisory message 74 tells the voter how to report that the voter's selections have not been received, if after a reasonable time period following the voting.

Figure 6:
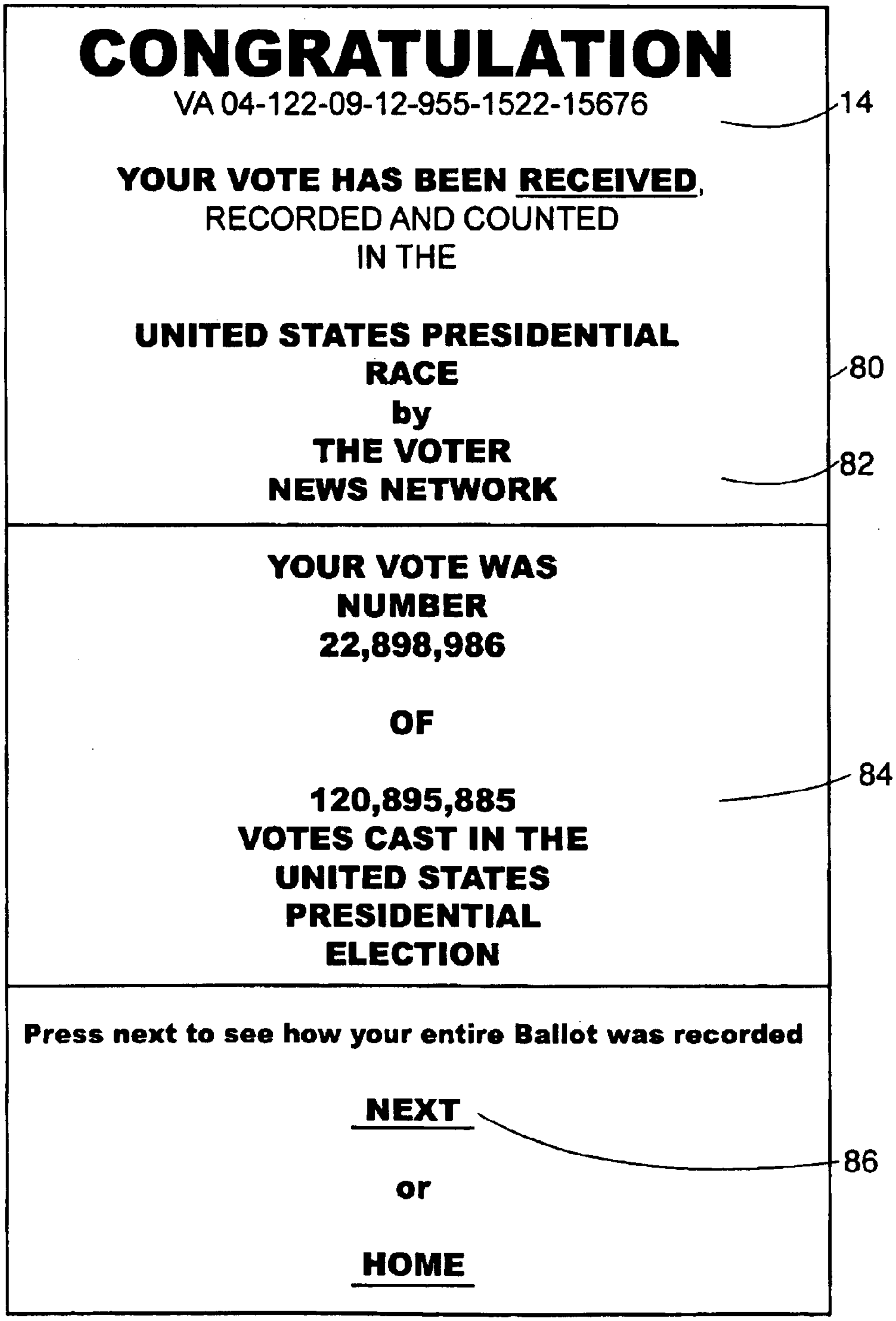
FIG. 6 illustrates a first voter validation screen of a national-level election reporting web site accessible through a computerized network, in accordance with the present invention.
Figure 7:
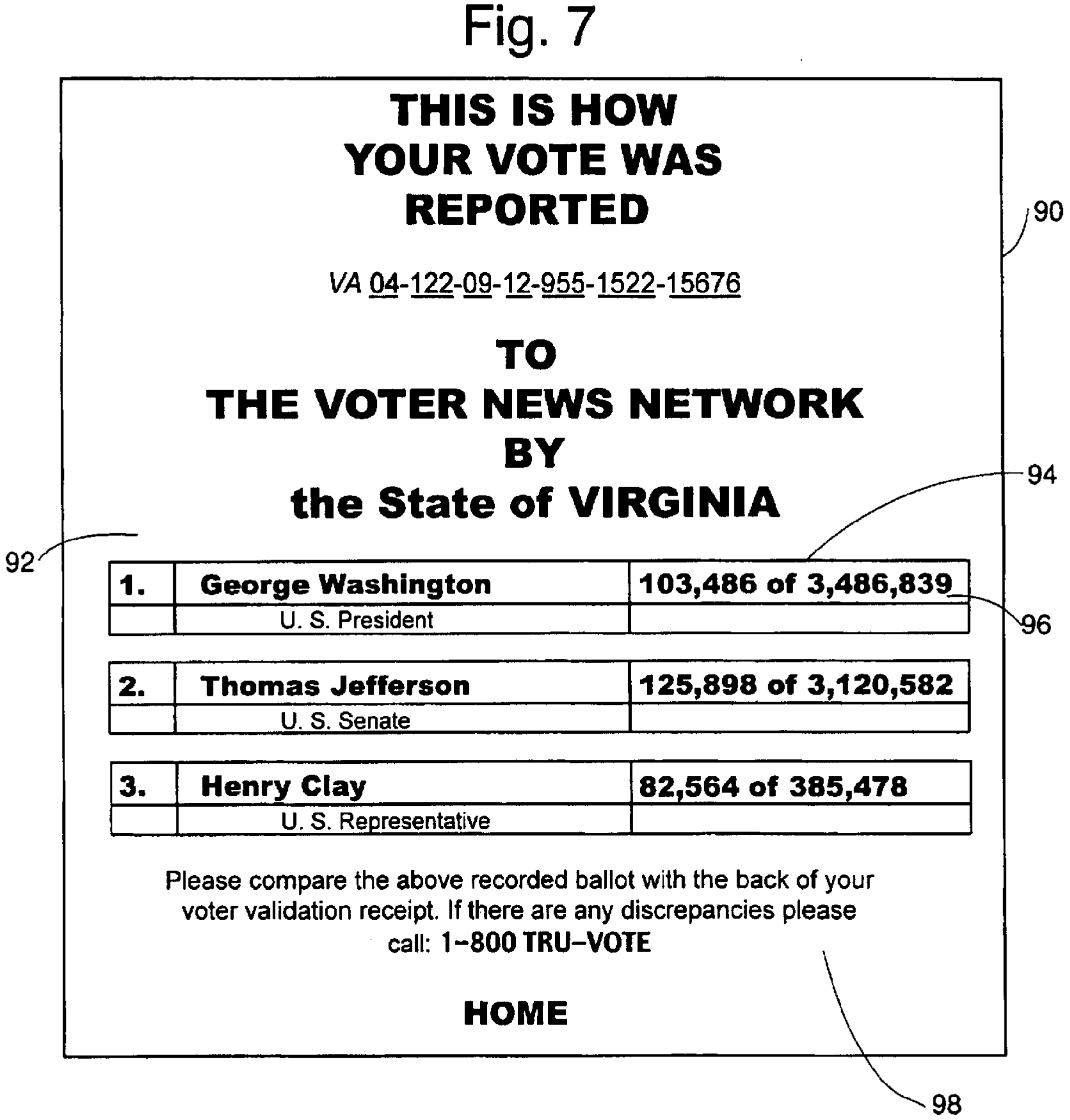
FIG. 7 illustrates a second voter validation screen of a national-level election reporting web site accessible through a computerized network, in accordance with the present invention.

In the event of national elections, the voter's votes for national office candidates are reported to a national tabulation center. The tabulation of the particular vote is likewise verifiable through a national tabulation web site, such as be accessed through a computer network. FIG. 6 illustrates a first voter validation screen 80 of the national-level election reporting web site accessible through a computerized network, in accordance with the present invention. Upon presentation of appropriate security mechanisms, the voter validation screen 80 displays the particular voter's validation receipt number 14, together with a report 82 that the voter's vote was included in the national election tabulation. The report 82 includes a statement 84 as to the sequential number of the vote the voter represents in the total number of votes for the candidate. A button 86 allows the voter to move to a second voter validation screen 90 of the national-level election reporting web site, as illustrated in FIG. 7.

The second voter validation screen 90 includes a report generally 92 of the candidates and national offices for whom the voter voted, together with the sequential number 94 of the vote by the voter for the candidate and the total number of votes 96 for the candidate. An instruction message 98 explains to the voter how to report discrepancies between the information on the voter validation receipt 10 and the information on the voter validation screens 80, 90.

Figure 8:
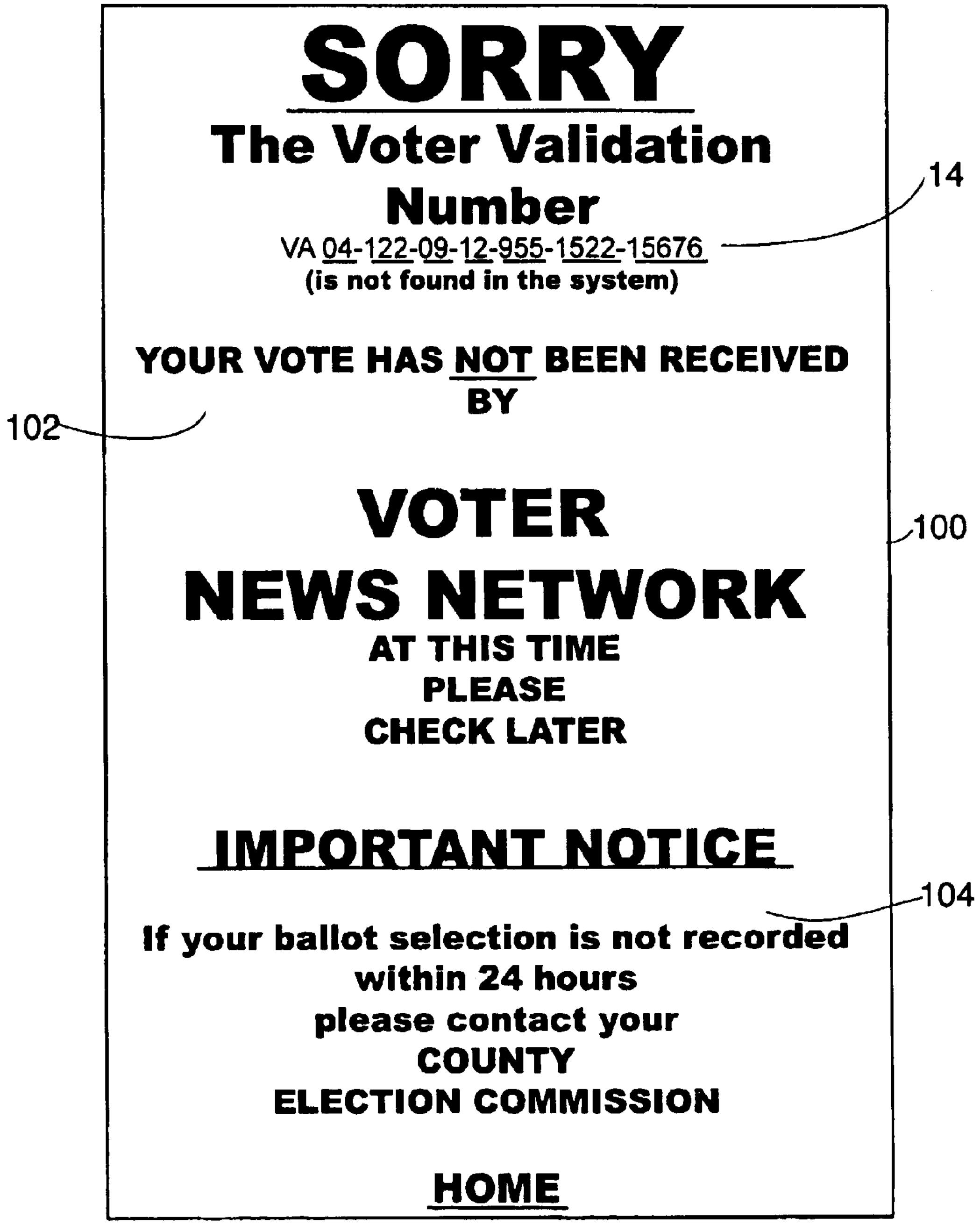
FIG. 8 illustrates a third voter validation screen of a national-level election reporting web site accessible through a computerized network, in accordance with the invention.

FIG. 8 illustrates a third voter validation screen 100 of the national-level election reporting web site accessible through a computerized network, in accordance with the invention. The third voter validation screen 100 displays the voter validation number 14, together with a statement 102 that the vote has not been received. An advisory message 104 tells the voter how to report that the voter's selections have not been received, if after a reasonable time period following the voting.

Figure 9:
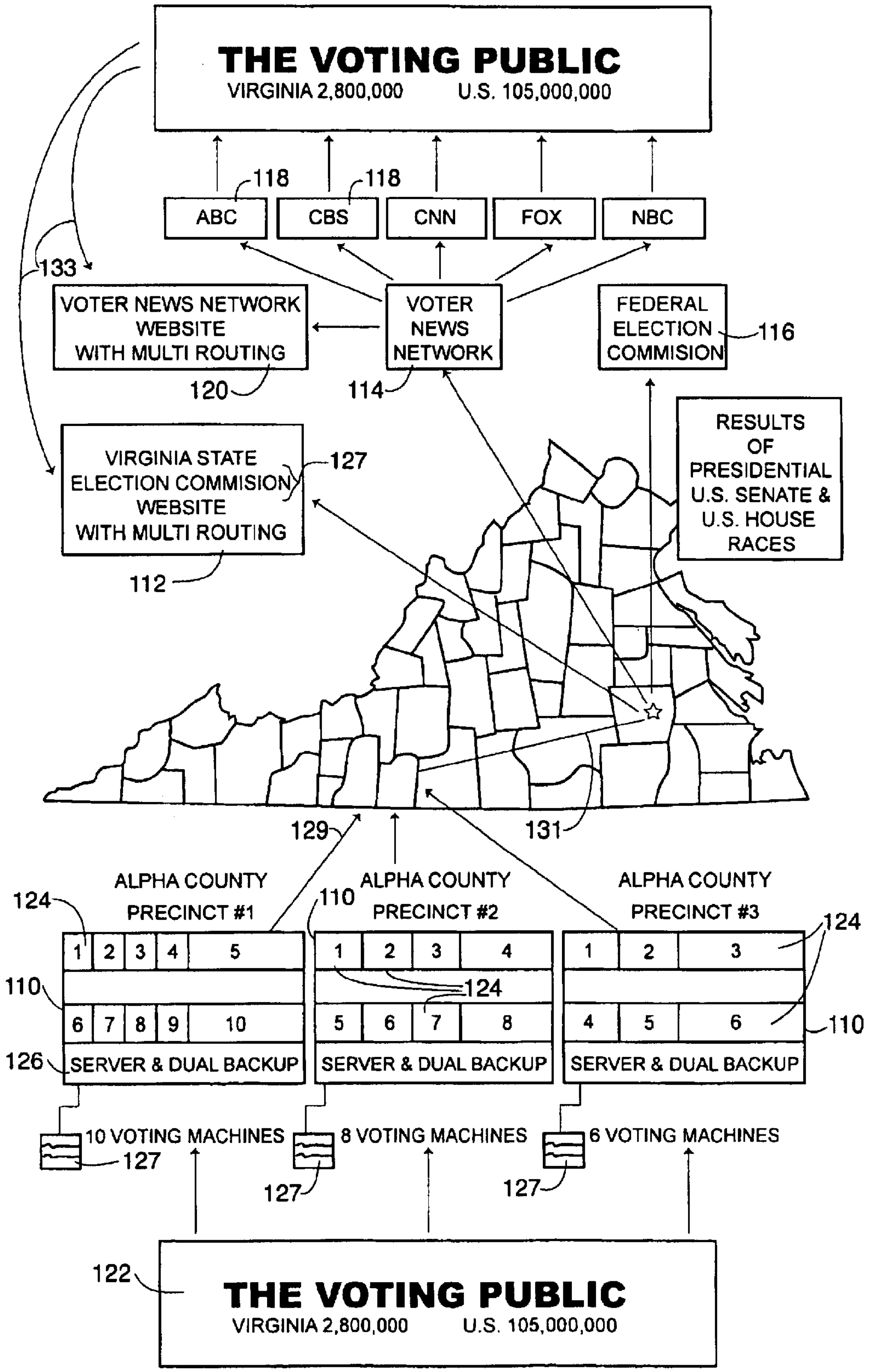
FIG. 9 is a schematic illustration of the flow of votes from local-level voting to superior-level vote tabulation centers according to the present invention.

FIG. 9 is a schematic illustration of the flow of votes from local-level voting precincts generally 110 to superior level vote tabulation centers (112 for the state tabulation center and 114 for the national tabulation center), according to the present invention. The votes are communicated from the state tabulation center 112, such as the state election commission, to the federal election commission 116. The national tabulation center 114 communicates the tabulated votes to news organizations generally 118 and/or to a network of news services 120. The voters 122 initiate the vote tabulation by voting at particular voting machines 124 at the precincts 110. In the illustrated embodiment, a controller 126, such as a computer server, operates the voting machines 124, monitors the voting, and creates the voter validation number. A printer 127 generates the voter validation receipt 10. The controller 126 communicates 129 the votes to the county election department, which communicates 131 with the state tabulation center 112. These tabulated votes are in turn reported to the national tabulation center 114. FIG. 9 accordingly shows the flow of votes or ballot selections from the voting public 122 through (a) voting machines 124 in (b) each precinct 110 within the state to (c) the state election commission or tabulation center 112 generally located at the state's capital where the voters data are compiled and the result is made accessible to the voter on the state's website (see generally 127). This information is also made available to independent national voter reporting agency 114. However, the built-in security measures allow only the voter to access and review his own ballot selection, thus preserving the anonymity and confidentiality of the voter.

The election voting apparatus and method of the present invention enables certification, validation, and verification of votes cast by voters. With reference to FIG. 9, the voter attends the assigned precinct 110 and votes. The computer controller 126 located locally at the precinct 110 or at county elections office operates to provide the voter validation receipt 10, illustrated in FIGS. 1 and 2. The voter validation receipt 10 is the first and primary source of evidence that the voter has in order to prove that the voter did vote and the candidate or ballot question for whom or which the voter intended to vote. The computer controller 126 generates the voter validation number 14. This is printed on the front side of the voter validation receipt 10, together with the PIN 38 and on the back or second part, with the candidates and office for whom the voter voted. Upon receiving the printed voter validation receipt 10, the voter reviews the printed names 48 on the back (or the second part) of the voter validation receipt. Upon assuring himself or herself that the list of candidate names 48 are the persons for whom the voter voted, i.e., the candidates listed are correct, the voter signs the voter validation receipt 10 on the front in the field for the endorsement 42, thereby certifying the vote. In the illustrated embodiment, the voter signs the voter validation receipt 10 in the presence of a poll worker. The poll worker also signs in the field for poll worker endorsement 44 as a witness and validates the receipt as with a seal 46 and with the poll worker's number.

Additionally, every vote cast within the state is automatically assigned a sequential number as the voter's ballot selections are transmitted periodically (for example, hourly) from each precinct to a superior tabulation center, such as a state election commission.

This is an internal audit tool to assure that every vote that was cast in the state, including absentee votes can be accounted for. Likewise, every vote is sequentially numbered a second time as each state reports its vote totals to a superior central vote receiving center, for example, a network of news organizations that collects and tabulates votes for inclusion in national federal elections. In an alternate embodiment, the state votes are communicated to an official national tabulation center.

At this point, the voter will have fulfilled his responsibility in the voting process. Within a short period of time thereafter, the voter can log onto a computer network, such as the particular state's website on the global worldwide web or other interactive computer network generally 133, in order to verify his vote. With reference to FIG. 3, the voter enters his voter validation number 14 shown on the voter validation receipt 10 and the personal PIN number 38. The personal PIN number 38 is shown on the voter validation receipt. In a preferred embodiment, the PIN number 38 is printed on a perforated portion of the voter validation receipt 10, so that it can be separated from the receipt. The personal PIN number 38 is preferably randomly generated by the computer at the time of voting or can be designated by the voter, such as the last four digits of an identification number familiar to the voter such as the Social Security number.

Upon accessing the state website, the voter then views state screen 52 illustrated in FIG. 3. This screen 50 includes the report 52 that provides confirmation to the voter that his vote was received recorded and counted by the state and tells what number 54 his vote was of the total number of votes cast.

Figure 4:
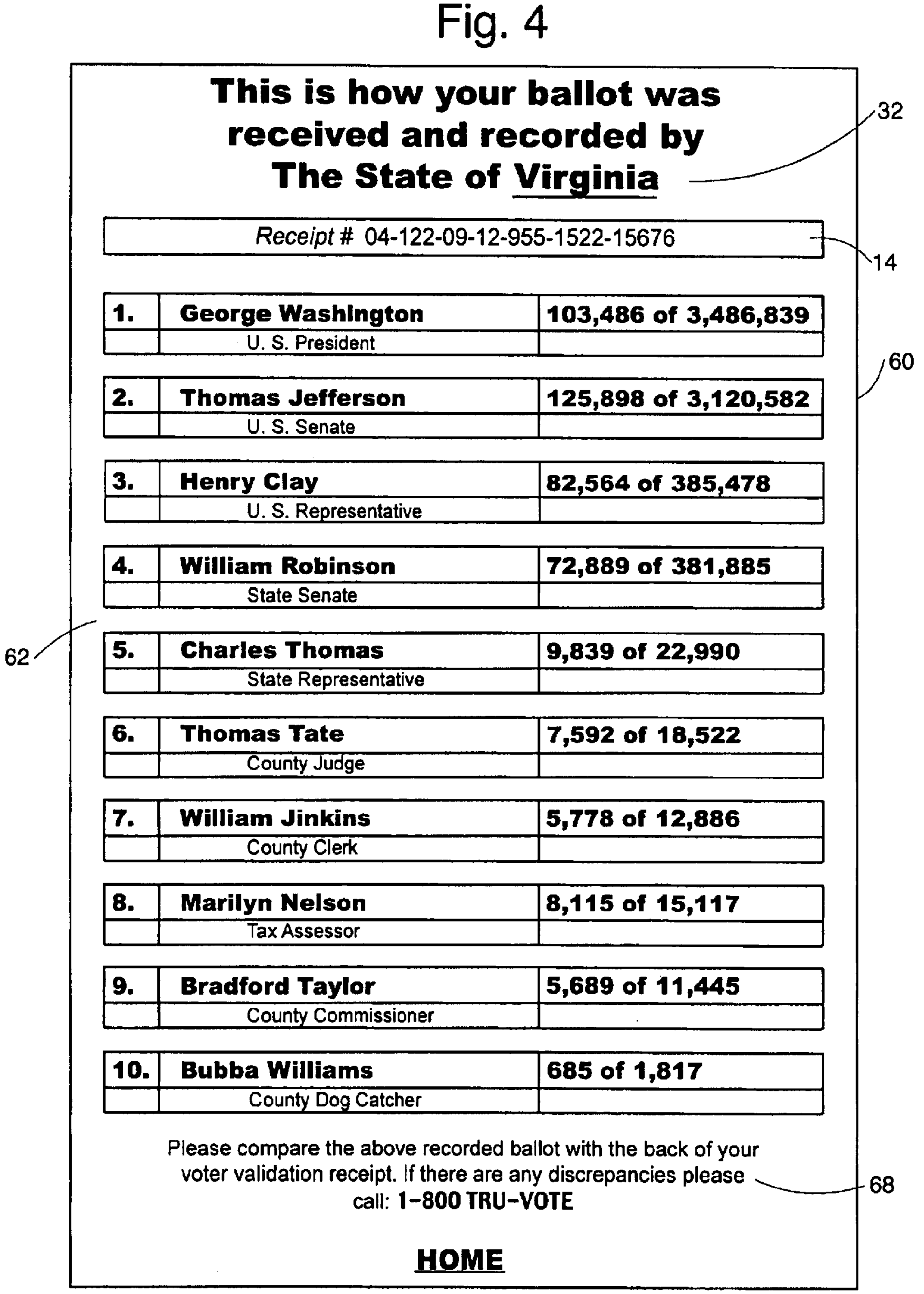
FIG. 4 illustrates a second voter validation screen of a state-level election reporting web site accessible through a computerized network, in accordance with the present invention.

If desired, the voter can enter the personal PIN 38, and with the button or link 56, access the second state screen 60 illustrated in FIG. 4. The second state screen 60 reports how the entire ballot for the voter was received, recorded and counted. The state screen 60 shows what number 64 the voter was out of the total number of votes 66 cast in each race. The second column of number 66 headed "total number of votes" will be the same for every voter in the state who cast a vote in each of the respective races. These totals serve as one of the built-in automatic check points which assure that all votes that were cast in the state were counted. If an error is detected by a ballot not being included in the state's grand total in any of the races, the affected voter is first to know, and the state election commission can be the second to know if the voter acts to notify the commission.

It is to be appreciated that voters can make printouts of the screens for their records, if desired. The printouts of state screen 50 and state screen 60 provide the voter with additional evidence that the person's vote was received by the state and that the vote was recorded and counted in the manner intended. An officially cast vote not included in the state's grand totals can be corrected by presenting the county election commission with a copy of the officially signed, witnessed and sealed voter validation receipt 10. The affected voter's ballot can then be entered manually by the county and the vote added to the state's grand total.

FIG. 5 illustrates the state screen 70 that is displayed if the voter's vote has not yet been received by the central voting tabulating center 112 at the time the voter is checking whether his vote was received. The voter can check at a later time. If the vote is not indicated as received after a period, such as 24 hours, the voter should contact his county election commission.

The state vote is communicated the national tabulation center 114. The voter may likewise contact the website of the national tabulation center 114, similarly to contacting the state website as discussed above. This enables the voter to determine how his vote was counted nationally. FIG. 8 provides the screen 100 that is displayed if the voter's vote has not yet been received by the national tabulation center. FIG. 6 illustrates the screen 80 that verifies the voter's vote was included in the national tabulation. FIG. 7 illustrates the screen 90 that provides the summary of the vote reported by the state tabulating center 112 to the national tabulating center 114. The voter can compare the information on the voter validation receipt 10 to the reported vote to verify proper and correct recording of his vote. If in error, the voter may contact the elections commission for correction.

The flow chart in FIG. 9 shows the flow of the data of the voter's ballot selections from the voting public through (a) the voting machines 124 in (b) each precinct 110 to (c) the state election commission 112, typically located at the state's capital, where the voter's data are compiled and posted on the state's website. This information is also made available to the national voter reporting agency 114, including media agencies such as the "Voter News Network" that compiles the result of national elections. The national tabulation center 114 also posts the result to its website for each voter to review, as discussed above. Voters access the web site with the use of the voter validation numbers and the personal PIN numbers. The voters verify that the vote was recorded and counted in the exact manner intended. The voter can print out the ballot selection and compare it with information on the back of the voter validation receipt 10 received at the voting booth. Errors in balloting, tabulating, and reporting can be determined and corrective action taken.

In summary, the present invention provides the voting system method and apparatus for (1) certification, (2) validation, and (3) verification of every voter's ballot selections. The ballot selection is certified by use of the voter's endorsement or signature 42 on the voter validation receipt 10. The voter's ballot selection is validated with the poll worker's endorsement or signature 44, the seal 46, and the voter validation receipt number 14 containing indicia of voting (machine number, precinct, and time) particular to the voter. The voter's ballot selections are verified by the voter and only the voter through the state, national or other other web sites 112, 114, accessed using the voter validation receipt number 14 and the PIN 38. It thus is seen that a vote verification method and apparatus is now provided that enables voters readily to verify whether or not the vote has been properly counted. In the event of detected error, the voter may quickly bring the error to the attention of the authorities for correction. The anonymity and confidentiality of the voting process is maintained. Though the preferred embodiment uses a world wide interactive computer network, it should be understood that a telephone counterpart may readily be used with voice activated readouts of all the data shown in the drawings, and with the associated printouts and reports.

The voter validation system can be funded via two levels of voluntary taxpayer checkoff. At the federal level, taxpayers can have the option to designate a dollar amount of their federal tax liability to a specified fund. The checkoff is similar to the current Presidential Election campaign fund. Unlike the Presidential election campaign fund, when taxpayers do not have a tax liability they cannot designate taxes to go to the fund. However, many taxpayers have no final tax liability as they receive substantial refunds. Preferably these taxpayers will have the option to contribute to the fund. Likewise, states can establish such election funds.

While the invention of the improved voter certification, validation, and verification apparatus and method has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. An election method for validation and verification of voting by a voter, comprising the steps of:

(a) receiving by a central processor from a voter a vote for at least one ballot selection in an election;

(b) generating by the central processor a voter validation number containing first indicia of the voter associated with the voting by the voter;

(c) providing a voter validation receipt containing the voter validation number;

(d) validating the voter validation receipt, whereby the authenticity thereof can be established at a later time if necessary to correct a vote tabulation error; and (e) selectively verifying through an accessor responsive to the voter validation number the vote of the voter with an election result tabulated by a vote tabulation center.

2. The election method as recited in claim 1, wherein the step (e) comprises the voter verifying the voter validation number with a vote tabulation center.

3. The election method as recited in claim 1, wherein the step (e) verifying comprises the voter accessing a tabulation report that lists voter validation numbers.

4. The election method as recited in claim 1, wherein step (e) verifying comprises accessing a tabulation report on an information site via an interactive computer network.

5. The election method as recited in claim 1, wherein the step (d) of validating comprises endorsing the voter validation receipt with a validation indicia.

6. The election method as recited in claim 5, wherein the validation indicia comprises a signature of the poll worker.

7. The election method as recited in claim 5, wherein the validation indicia is a seal applied to the voter validation receipt.

8. The election method as recited in claim 5, wherein the validation indicia is the voter validation number.

9. The election method as recited in claim 1, further comprising the step of the voter certifying the voter validation receipt.

10. The election method as recited in claim 9, wherein step (c) further comprises providing a report of the vote by the voter.

11. The election method as recited in claim 10, wherein the step of certifying further comprises the voter comparing the report of the vote with the intentions of the voter.

12. The election method as recited in claim 9, wherein the step of certifying comprises the voter endorsing the voter validation receipt.

13. The election method as recited in claim 12, wherein endorsing comprises the voter signing the voter validation receipt.

14. An election apparatus for validation and verification of voting by a voter, comprising:

a voting device with a central processor for receiving from a voter a vote for at least one ballot selection in an election;

a generator that provides a voter validation receipt bearing a voter validation number containing first indicia of the voter;

a validator that endorses the voter validation receipt with a validation indicia whereby the authenticity thereof can be established at a later time if necessary to correct a vote tabulation error; and an accessor responsive to the voter validation number for verifying the vote with an election result tabulated by a vote tabulation center.

15. The election apparatus as recited in claim 14, wherein the voter validation receipt further comprises a certification by the voter of the vote.

16. The election apparatus as recited in claim 15, wherein the certification comprises a voter endorsement.

17. The election apparatus as recited in claim 16, wherein the voter endorsement is a signature by the voter.

18. The election apparatus as recited in claim 14, wherein the validator comprises a poll worker; and wherein the validation indicia on the voter validation receipt comprises an endorsement by the poll worker.

19. The election apparatus as recited in claim 18, wherein the endorsement comprises a signature of the poll worker.

20. The election apparatus as recited in claim 18, wherein the endorsement comprises a seal applied by the poll worker to the voter validation receipt.

21. The election apparatus as recited in claim 14, wherein the accessor comprises an interactive device accessible through a computer communication network.

22. The election apparatus as recited in claim 14, further comprising a controller for operating the voting device, generating the voter validation number, producing the voter validation receipt, and reporting the vote to a tabulation center.

23. The election apparatus as recited in claim 14, further comprising an interactive network communicating with the voting device and with a vote tabulation center that receives the vote for a vote tabulation report.

24. The election apparatus as recited in claim 14, wherein the accessor is responsive to providing the voter validation number for verifying the vote by comparing a report of the vote with an election result tabulated by a vote tabulation center.

25. The election apparatus as recited in claim 14, wherein the accessor comprises a printed report of voter validation numbers included in the election result.

26. The election apparatus as recited in claim 14, wherein the generator includes a report of the vote by the voter with the voter validation receipt.

27. The election apparatus as recited in claim 26, wherein the report of the vote by the voter includes the candidates selected by the voter for receiving votes.

28. The election apparatus as recited in claim 27, wherein the voter verifies the vote through the accessor by comparing the report with the votes associated with the voter validation number included in an election result tabulated by the vote tabulation center.

29. The election apparatus as recited in claim 28, wherein the accessor comprises an interactive device accessible by the voter through a computer communication network.

30. The election apparatus as recited in claim 28, wherein the accessor comprises a printed report accessible by the voter of voter validation numbers included in the election result.

31. The election apparatus as recited in claim 14, wherein the accessor comprises an interactive device accessible through a computer communication network.

32. The election apparatus as recited in claim 14, wherein the accessor comprises a printed report of voter validation numbers included in the election result.

33. An election method for validation, voter certification, and verification of voting by a voter, comprising the steps of:

(a) receiving by a central processor from a voter a vote for at least one ballot selection in an election;

(b) generating by the central processor a voter validation number containing indicia of the voter associated with the voting by the voter;

(c) providing a voter validation receipt containing the voter validation number;

(d) certifying the vote by the voter endorsing the voter validation receipt (e) validating the voter validation receipt, whereby the authenticity thereof can be established at a later time if necessary to correct a vote tabulation error; and (f) selectively verifying the vote of the voter using the voter validation number with an accessor to a vote tabulation center.

34. The election apparatus as recited in claim 33, wherein the step (e) comprises using an interactive device accessible through a computer communication network.

35. The election apparatus as recited in claim 33, wherein the step (e) comprises using a printed report of voter validation numbers included in the election result.

36. An election apparatus for validation, voter certification, and verification of voting by a voter, comprising:

a voting device with a central processor for receiving from a voter a vote for at least one ballot selection in an election;

a generator that provides a voter validation receipt bearing a voter validation number containing first indicia of the voter;

a validator that endorses the voter validation receipt with a validation indicia, whereby the authenticity thereof can be established at a later time if necessary to correct a vote tabulation error;

means for the voter to certify the vote by endorsement of the voter validation receipt; and an accessor responsive to the voter validation number for selectively verifying the vote by comparing the voter validation receipt with an election result tabulated by a vote tabulation center.

37. The election apparatus as recited in claim 36, wherein the accessor comprises an interactive device accessible by the voter through a computer communication network.

38. The election apparatus as recited in claim 36, wherein the accessor comprises a printed report accessible by the voter of voter validation numbers included in the election result.

* * * * *